United States Patent
Matyas, Jr. et al.

(10) Patent No.: US 6,687,375 B1
(45) Date of Patent: *Feb. 3, 2004

(54) GENERATING USER-DEPENDENT KEYS AND RANDOM NUMBERS

(75) Inventors: Stephen Michael Matyas, Jr., Manassas, VA (US); Mohammad Peyravian, Cary, NC (US); Allen Leonid Roginsky, Durham, NC (US); Nevenko Zunic, Wappingers Falls, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/324,418

(22) Filed: Jun. 2, 1999

(51) Int. Cl.[7] .............................. H04L 9/00; H04K 1/00
(52) U.S. Cl. ........................................ 380/45; 380/30
(58) Field of Search ..................................... 380/45, 30

(56) References Cited

U.S. PATENT DOCUMENTS

| | | | | |
|---|---|---|---|---|
| 4,878,246 A | | 10/1989 | Pastor .......................... | 380/44 |
| 4,944,007 A | | 7/1990 | Austin .......................... | 380/21 |
| 5,199,070 A | * | 3/1993 | Matsuzaki et al. ............ | 380/30 |
| 5,319,705 A | * | 6/1994 | Halter et al. ................... | 705/54 |
| 5,541,994 A | * | 7/1996 | Tomko et al. ................. | 380/30 |
| 5,680,460 A | * | 10/1997 | Tomko et al. ................. | 713/186 |
| 5,709,114 A | * | 1/1998 | Dawson et al. ............ | 70/278.2 |
| 6,035,398 A | * | 3/2000 | Bjorn .......................... | 713/186 |
| 6,065,117 A | * | 5/2000 | White .......................... | 713/159 |
| 6,215,874 B1 | | 4/2001 | Borza et al. .................. | 380/46 |
| 6,219,794 B1 | | 4/2001 | Soutar et al. ................ | 713/202 |
| 6,226,383 B1 | | 5/2001 | Jablon .......................... | 380/30 |

OTHER PUBLICATIONS http://www.cs.sandia.gov/~mccurley/healt/node8.html; "Biometric Authentication", (1995).
Press Release, "TrueTouch Demonstrates its Biometric Authentication Application Programmers Interface (BAAPI) at CardTech/SecurTech", Apr., 1998.
Oracle Advanced Networking Option Administrator's Guide, Chapter 8, (1996).
AST–Presenting security using biometrics, www.multimania.com/ast/uk/uk–ID1.htm, Apr. 3, 1999.
Kim, Hyun–Jung, *Biometrics, Is it a Viable Proposition for Identity Authentication and Access Control?*, Computers & Security, vol. 14, pp. 205–214 (1995).
George, M.H., et al., *A Robust Speaker Verification Biometric*, Proceedings, the IEEE 29th International Carnahan Conference on Security Technology, pp. 41–46 (Oct. 1995).

(List continued on next page.)

*Primary Examiner*—Gilberto Barron
*Assistant Examiner*—Benjamin E Lanier
(74) *Attorney, Agent, or Firm*—Myers Bigel Sibley & Sajovec, P.A.; Jeanine S. Ray-Yarletts (57) ABSTRACT

Methods, systems and computer program products are provided which generate a cryptographic key utilizing user specific information to generate a user dependent key. The user specific information may be a user identification or biometric information associated with a user. In particular embodiments of the present invention a seed value is modified with biometric information to generate a user dependent key value. In alternative embodiments a key value is hashed with user specific information or user specific information is hashed and then combined with the key value to generate the user dependent key value. In still another embodiment of the present invention the space of potential key values is divided into subspaces and the subspaces assigned based on user specific information. A key value is then generated from the assigned subspace. Thus, the generated key values for different users are guaranteed to be disjoint.

31 Claims, 6 Drawing Sheets

OTHER PUBLICATIONS

Davida, George I., *On Enabling Secure Applications Through Off-line Biometric Identification, Proceedings of the IEEE Computer Society Symposium on Research in Security and Privacy*, pp. 148–157 (1998).

Brown, Ann V., et al., *Biometric Encryption: Information Privacy In a Networked World, EDI Forum: The Journal of Electronic Commerce*, vol. 10, No. 3, pp. 37–43 (1997).

Matyas, Mike, et al., *Reversible data mixing procedure for efficient public–key encryption, Computers & Security*, vol. 17, No. 3, pp. 265–272 (1998).

*ANSI Standard X9.31–1998 Digital Signatures Using Reversible Public Key Cryptography for the Financial Services Industry (rDSA)*, pp. 1–64 (May 1998).

Schneier, Bruce, *Applied Cryptography: Protocols, Algorithms, and Source Code in C*, pp. 442–445, 466–474 (Dec. 1995).

Rivest et al. "A Method for Obtaining Digital Signatures and Public Key Cryptosystems," *Communications of the ACM*, vol. 21, No. 2, Feb. 1978, pp. 120–6.

\* cited by examiner

GENERATING USER-DEPENDENT KEYS AND RANDOM NUMBERS

RELATED APPLICATIONS

The present application is related to commonly assigned and concurrently filed U.S. patent application Ser. No. 09/324,308, entitled "GENERATING USER-DEPENDENT RSA KEYS," the disclosure of which is incorporated herein by reference as if set forth fully.

FIELD OF THE INVENTION

The present invention relates to cryptography and more particularly to the generation of cryptographic key values and/or pseudo random numbers.

BACKGROUND OF THE INVENTION

In cryptography it is often useful to generate a key value for use in the cryptographic process. Such key values are typically generated by a pseudo random number generator utilizing a secret seed value. Problems may arise, however, if the cryptographic code is broken by an unauthorized party. For example, if the unauthorized party learned the secret seed value, the unauthorized party could then duplicate the cryptographic key value utilizing the secret seed value. In such a case, there may be no way to audit the source of the encrypted information to determine whether the information was generated by an authorized party or an unauthorized party. Furthermore, there may be no mechanism for authenticating the cryptographic key based on an individual user. Also, when the encryption key of a single user of a group of users which share encryption methodologies is compromised, the entire group may be compromised as the encryption is not dependent on the identity of the user within the group.

In general, mechanisms for differentiating between users are known. For example, a particular individual can be identified or verified through a user identifier (such as a globally unique name) or biometric data (such as fingerprint, hand geometry, iris pattern, facial features, voice characteristics, handwriting dynamics, earlobe characteristics, etc.).

As is well known to those having skill in the art, biometric information is one or more behavioral and/or physiological characteristics of an individual. Biometric identification and/or verification uses a data processing system to enable automatic identification and/or verification of identity by computer assessment of a biometric characteristic. In biometric verification, biometric information is verified for a known individual. In biometric identification, biometric information for an individual is compared to known biometric information for many individuals in order to identify the individual.

Biometric identification/verification systems, methods and computer program products can measure one or more of the following behavioral and/or physiological characteristics of an individual: fingerprint, hand geometry, iris pattern, facial features, voice characteristics, handwriting dynamics, earlobe characteristics and keystroke dynamics. Other biometric characteristics may be used. Applications using biometric technologies include biometric check cashing machines, payment systems that substitute biometric data for personal identification numbers, access control systems that use biometric data, biometric employee time and attendance recording and biometric passenger control for transportation. Many other applications may utilize biometric information for identification and/or verification. See the publications entitled "Biometrics, Is it a Viable Proposition for Identity Authentication and Access Control", to Kim, Computers & Security, Vol. 14, 1995, pp. 205–214; "A Robust Speaker Verification Biometric", to George et al., Proceedings, the IEEE 29$^{th}$ International Carnahan Conference on Security Technology, October 1995, pp. 41–46; "On Enabling Secure Applications Through Off-line Biometric Identification", to Davida et al., Proceedings of the IEEE Computer Society Symposium on Research in Security and Privacy, 1998, pp. 148–157; and "Biometric Encryption: Information Privacy in a Networked World", to Brown et al., EDI Forum: The Journal of Electronic Commerce, v. 10, No. 3, 1997, pp. 37–43. However, while biometric identification and user identification may allow for identification of users, these existing uses may not allow for authentication of the source of encryption keys.

In the above cited Davida et al. publication, in Section 5.2 it was proposed that biometrics could be used with or as keys. However, Davida et al. assumes that the biometric information is secret information. Furthermore, Davida et al. may not work for any size key and describes a procedure which may not allow for precomputing information for generation of a key value. Furthermore, the proposal of Davida et al. may allow two users to generate the same key values and, thus, does not assure that the generated keys are disjoint.

In light of the above discussion, a need exists for improvements in the generation of encryption keys.

SUMMARY OF THE INVENTION

In view of the above discussion, it is an object of the present invention to provide cryptographic values which may be authenticated.

A further object of the present invention is to provide for the generation of cryptographic values which may be audited to determine the user which generated the cryptographic values.

These and other objects of the present invention may be provided by methods, systems and computer program products which generate a cryptographic value utilizing user specific information to generate a user dependent value. The user specific information may be a globally unique user identification or biometric information associated with a user. In particular embodiments of the present invention a seed value is modified with biometric information to generate a user dependent key value. In alternative embodiments a cryptographic value is hashed or otherwise modified with user specific information or user specific information is hashed and then combined with the cryptographic value to generate the user dependent cryptographic value. In still another embodiment of the present invention cryptographic values are generated in a user specific subspace of the space of potential cryptographic values. Thus, the generated cryptographic values for different users may be guaranteed to be disjoint.

In specific embodiments of the present invention, user specific information about a user is obtained and a seed value of a key generation procedure is modified with the user specific information so that the key generation procedure generates a user dependent cryptographic key. The key generation procedure may be a pseudo random number generator (PRNG) in which case the seed value for the PRNG is modified with the user specific information.

In a particular embodiment of the present invention, the seed value is modified by concatenating the user specific information with the seed value so as to provide a user specific seed value. Furthermore, the seed value may be further modified by mixing bits of the user specified seed value so as to increase the uniformity of a distribution of entropy in the user specified seed value.

In an alternative embodiment of the present invention, a cryptographic value is generated by obtaining non-secret user specific information about a user and obtaining an initial cryptographic value by, for example, obtaining a pseudo random number from a pseudo random number generator. The initial cryptographic value is then modified with the non-secret user specific information so as to provide a user dependent cryptographic value. In particular, the initial cryptographic value may be modified by hashing the initial cryptographic value and the non-secret user specific information utilizing a one-way hash operation so as to generate the user dependent cryptographic value.

In a still further embodiment of the present invention, the user dependent cryptographic value (S) comprises n bits, the results of the hash operation provides h bits and the step of hashing involves determining an intermediate hash value (Z) utilizing the concatenation of hash values defined by, $$Z=H(R,B)\|H(R+1,B)\|H(R+2,B)\| \ldots H(R+a,B)$$

where H is the one way hash operation, B is the non-secret user specific information and a is the largest integer smaller than n/h. The user dependent cryptographic value is then generated by selecting n bits from Z to provide the user dependent cryptographic value.

In one embodiment the selected n bits are the n most significant bits of Z.

In another alternative embodiment for generating a cryptographic value an initial cryptographic value is obtained. A final intermediate hash value resulting from hashing user specific information about a user utilizing a one-way hash operation is also obtained. The final intermediate hash value is combined with the initial cryptographic value so as to provide the user dependent cryptographic value.

In a particular embodiment of such an alternative embodiment, the user dependent key value (S) comprises n bits and the results of the hash operation provides h bits. The hashing then involves determining a first intermediate hash value (Z) utilizing the concatenation of hash values defined by, $$Z=H(B)\|H(B+1)\|H(B+2)\| \ldots H(B+a)$$

where H is the one way hash operation, B is the user specific information and a is the largest integer smaller than n/h. The final intermediate hash value is then provided by selecting n bits from Z. The selected n bits may be the n most significant bits of Z.

In a further aspect of the alternative embodiment, the final intermediate hash value and the initial cryptographic value are combined by EXCLUSIVE ORing the initial cryptographic value and the final intermediate hash value. Preferably, the final intermediate hash value is stored so as to provide a pre-computed intermediate hash value. In such a case, the final intermediate hash value may be obtained by accessing the stored pre-computed intermediate hash value.

In yet another alternative embodiment of the present invention, user specific information about a user is obtained and a user dependent cryptographic value selected from a user specific range of cryptographic values determined based on the user specific information. The user specific range of cryptographic values comprises a subspace of a range of potential cryptographic values from which a value generation procedure selects a cryptographic value. In a particular embodiment, the user specific information comprises b bits, the cryptographic values comprises n bits and the user specific range is determined by dividing the range of potential cryptographic values into $2^b$ subspaces. One of the subspaces is then selected as the user specific range of cryptographic values based on the user specific information. In a further embodiment, bits of the selected user dependent cryptographic value are mixed so as to increase the uniformity of a distribution of entropy in the user dependent cryptographic value.

In a still further embodiment of the present invention, the source of a cryptographic value is authenticated by obtaining entity specific information associated with a source entity and modifying a specified cryptographic value with the entity specific information to produce a branded value. When the branded value is received, the entity specific information is recovered from the received branded value. The source entity of the received branded value is then determined based on the recovered entity specific information.

In particular embodiments of the present invention, the entity specific information comprises biometric data from a user. Alternatively, the entity specific information may be a globally unique user identification associated with a user. Furthermore, the entity specific information may be a company identification.

In one embodiment of the present invention, the specified cryptographic value is modified by modifying a seed value of a key generation procedure with the entity specific information so that the key generation procedure generates a user dependent cryptographic key as the branded value. In such a case, the recovery of the entity specific information and the determination of the source entity may be made by generating a second branded value utilizing an expected seed value and the entity specific information and the key generation procedure and then comparing the generated second branded value with the received branded value.

In another embodiment of the present invention, the specified cryptographic value is modified by hashing the specified cryptographic value and the entity specific information utilizing a one-way hash operation so as to generate the branded value. In such a case, the recovery of the entity specific information from the received branded value and the determination of the source entity of the received branded value may be accomplished by generating a second branded value by hashing an expected specified cryptographic value and the entity specific information utilizing the one-way hash function. The generated second branded value is then compared with the received branded value to determine the source entity of the branded value.

In yet another embodiment of the present invention, the specified cryptographic value is modified by obtaining a final intermediate value as a function of the entity specific information and then combining the final intermediate value with the specified cryptographic value so as to provide the branded value. In such a case, the recovery of the entity specific information from the received branded value and the determination of the source entity of the received branded value may be accomplished by generating a second branded value by combining an expected specified cryptographic value and the final intermediate value. The generated second branded value is then compared with the received branded value to determine the source entity of the branded value.

In a still further embodiment of the present invention, the specified cryptographic value is modified by selecting a value from an entity specific range of cryptographic values based on the user specific information. The entity specific range of cryptographic values comprises a subspace of a range of potential cryptographic values from which a value generation procedure selects a cryptographic value. In such a case, the recovery of the entity specific information from the received branded value and the determination of the source entity of the received branded value may be accomplished by determining if the received branded values is within the entity specific range of cryptographic values associated with the source entity of the received branded value.

As will further be appreciated by those of skill in the art, the present invention may be embodied as methods, apparatus/systems and/or computer program products.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention can be embodied as systems, methods, or computer program products for generating a user dependent cryptographic key or any other value or quantity used in cryptography. As will be appreciated by those of skill in the art, a cryptographic key may be a random number or other value generated utilizing a seed value. Thus, while the present invention is described with reference to generating a cryptographic key, as used herein, that term is intended to include the generation of a pseudo-random number as such a number may be utilized as a cryptographic key or other value used in cryptography.

As will be further appreciated by those of skill in the art, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable or computer-readable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

Figure 1:
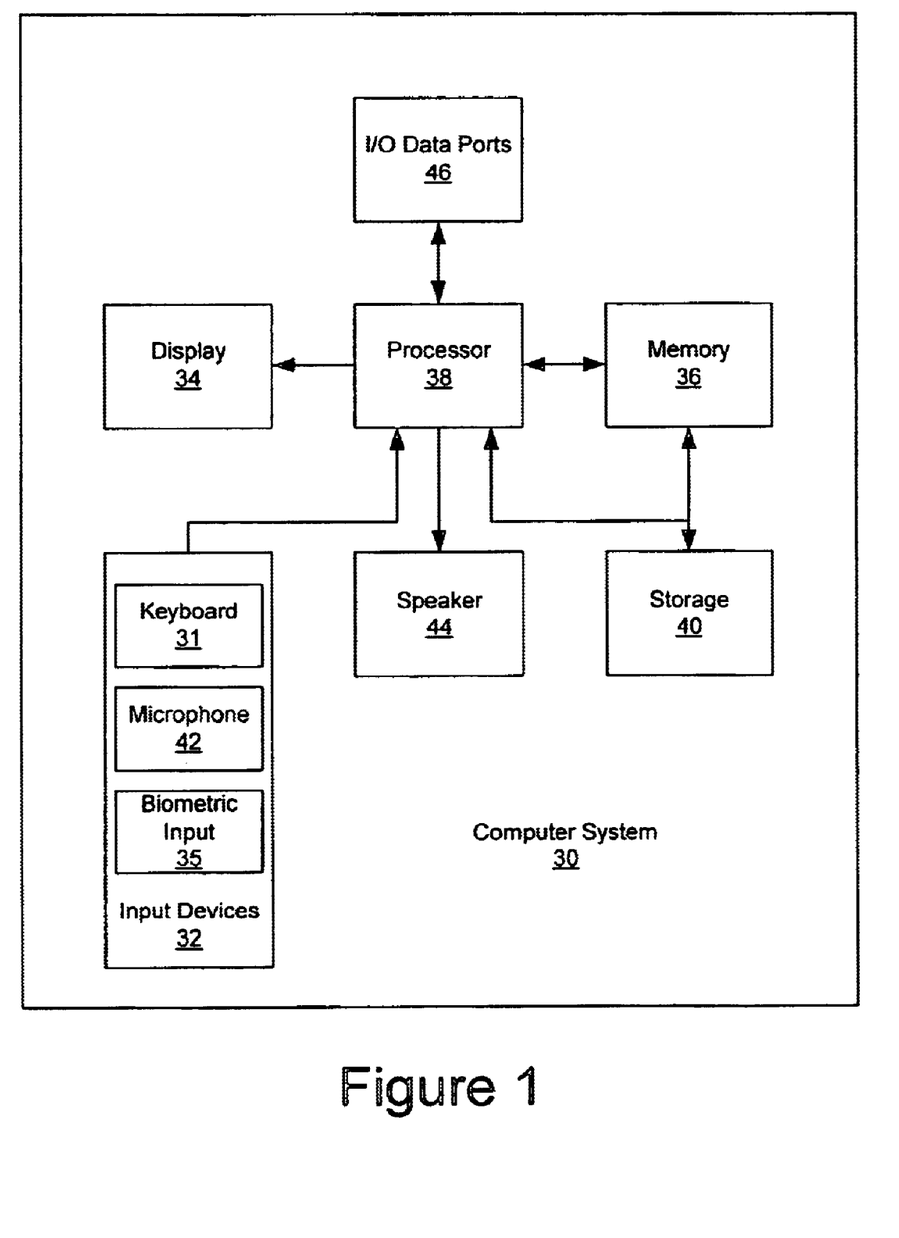
FIG. 1 is diagram of a data processing system suitable for use with the present invention.

Referring now to FIG. 1, an exemplary embodiment of a computer system 30 in accordance with the present invention typically includes input devices 32, such as a keyboard or keypad 31, a microphone 42 and/or preferably, a biometric information input device 35. The computer system 30 also preferably includes a display 34 and a memory 36 that communicate with a processor 38. The computer system 30 may further include a speaker 44 and an I/O data port(s) 46 that also communicate with the processor 38. The I/O data ports 46 can be used to transfer information between the computer system 30 and another computer system or a network (e.g., the Internet). FIG. 1 also illustrates that computer system 30 may include a storage device 40 which communicates with memory 36 and processor 38. Such a storage device may be any type of data storage device as described above. These components are included in many conventional computer systems (e.g., desktop, laptop, or handheld computers) and their functionality is generally known to those skilled in the art.

Furthermore, while the present invention is described with respect to the computer system 30, as will be appreciated by those of skill in the art, the present invention may be incorporated into many other devices where cryptographic keys are generated and, thus, may comprise an embedded function in many other devices. Thus, the present invention should not be construed as limited to use in computer systems such as illustrated in FIG. 1 but may be incorporated in any device having sufficient processing capabilities to carry out the operations described below.

Figure 2:
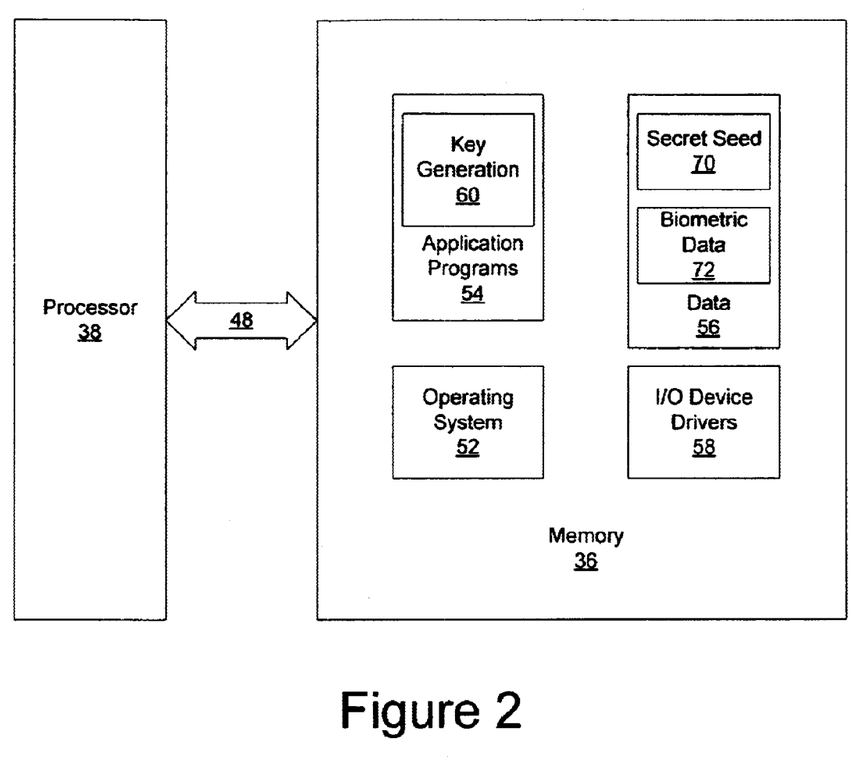
FIG. 2 is a detailed view of a data processing system suitable for use with the present invention.

FIG. 2 is a more detailed block diagram of the computer system 30 that illustrates one application of the teachings of the present invention. The processor 38 communicates with the memory 36 via an address/data bus 48. The processor 38 can be any commercially available or custom microprocessor or other processing system capable of carrying out the operations of the present invention. The memory 36 is representative of the overall hierarchy of memory devices containing the software and data used to implement the functionality of the computer system 30. The memory 36 can include, but is not limited to, the following types of devices: cache, ROM, PROM, EPROM, EEPROM, flash, SRAM, and DRAM.

As shown in FIG. 2, the memory 36 may hold four major categories of software and data used in the computer system 30: the operating system 52; the application programs 54; the input/output (I/O) device drivers 58; and the data 56. The I/O device drivers 58 typically include software routines accessed through the operating system 52 by the application programs 54 to communicate with devices such as the input devices 32, the display 34, the speaker 44, the microphone 42, the I/O data port(s) 46, and certain memory 36 components. The application programs 54 comprise the programs that implement the various features of the computer system 30 and preferably include at least one application module or object for key generation 60 which carries out the operations of the present invention as described below. Finally, the data 56 represents the static and dynamic data used by the application programs 54, operating system 52, I/O device drivers 58, and any other software program that may reside in the memory 36. As illustrated in FIG. 2, the data 56 preferably includes a secret seed value 70 and biometric or other user specific data 72. Additional intermediate data (not shown) may also be stored in memory. Furthermore, while the present invention is described as an application executing on computer system 30, as will be appreciated by those of skill in the art, the present invention may be implemented in any number of manners, including incorporation in operating system 52 or in an I/O device driver 58.

The present invention will now be described with respect to FIGS. 3 through 8 which are flowchart illustrations of embodiments of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

The present invention provides for generating cryptographic keys and random numbers using user specific information such as users's user identification (userID) data as well as users's biometric data. While userID data and biometric data are fundamentally different, the two data types have characteristics in common which may be exploited in providing user dependent cryptographic keys. For example, some of the differences in userID and biometric data can be identified as follows:

1) A userID is assigned to a user, whereas biometric data is obtained or derived from the user. Mathematically speaking, a user's userID is an independent variable, whereas a user's biometric data is a dependent variable.
2) A user's userID can be changed. A user's biometric data cannot be changed. At most, a user can attempt to switch from one biometric to another biometric (e.g., fingerprint to hand geometry).
3) Generally, the set or space of user identifiers may be dense, making it feasible to enumerate the set of user identifiers. Generally, the space of user biometric data is not dense, making it infeasible to enumerate the biometric data for each user.
4) Biometric data can be used to authenticate a user while userID data cannot be used to authenticate a user.
5) A userID is a constant. User biometric data is not constant.

However, the similarities in userID and biometric data which may be utilized to provide user dependent cryptographic keys can be identified as follows:

1) A userID is different for each user and biometric data is generally different for each user. Note that, in some cases, it may happen that the biometric data for one user overlaps (in whole or in part) with another user. The degree to which this may occur can depend on a combination of the biometric method being employed and the sensitivity of the biometric reader devices being employed.
2) A userID is non-secret data. Biometric data should be considered as non-secret data, although in some vendor proprietary systems user biometric data is encrypted (i.e., protected). Since there is no practical way to prevent the capture of user biometric data outside the biometric system, it is false to assume that the secrecy of user biometric data can be maintained over time.
3) Biometric data, like userID data, can be used to identify users. In fact, in some sense, biometric data offers a better mechanism for user identification, since biometric data provides a mechanism of positive identification, whereas userID data, until verified via a separate authentication protocol, is only representative of a claimed identity.

One potential advantage to using biometric data as the user specific information is that with biometric data, there is potentially an easy mechanism for the user to prove their identity, especially if the user carries their biometric certificate on a portable token (e.g., smart card). With a userID, the presumed or claimed identity of the user is known, however, the user to whom the key or cryptographic variable belongs will not necessarily have an easy means to prove that they are that user. A user will not always carry sufficient credentials to prove their identity (e.g., birth certificate or passport).

Figure 3:
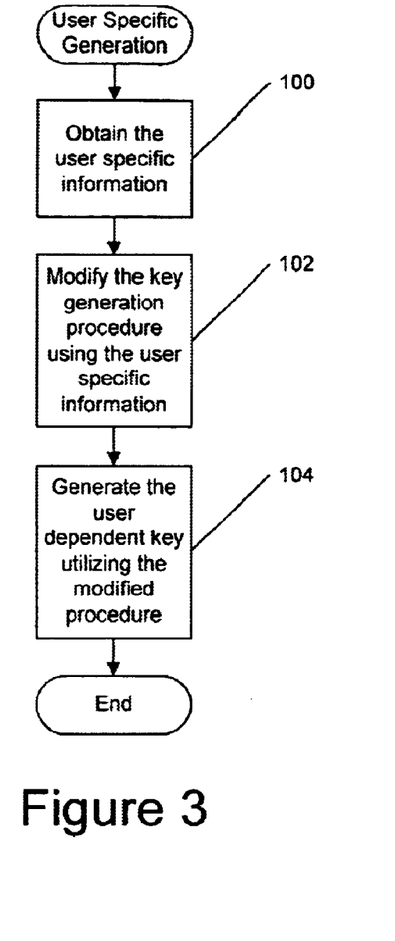
FIG. 3 is a flowchart illustrating operations according to one embodiment of the present invention.

Utilizing the above characteristics of userIDs and biometric data, the alternative embodiments of the present invention provide for the generation of cryptographic keys through differing modifications of key generation procedures as described in FIG. 3. As seen in FIG. 3, the present invention provides for generating a user dependent key value by first obtaining user specific information (block 100). A key generation procedure is then modified using the user specific information (block 102) and a user dependent key value generated utilizing the modified procedure (block 104). As used herein, the term "user specific information" refers to user identification data or biometric data as described above or a combination of user identification data and biometric data for a user. As described above, such information should not be assumed to be secret. Thus, the alternative embodiments of the present invention assume that the user specific information is non-secret information.

Figure 4:
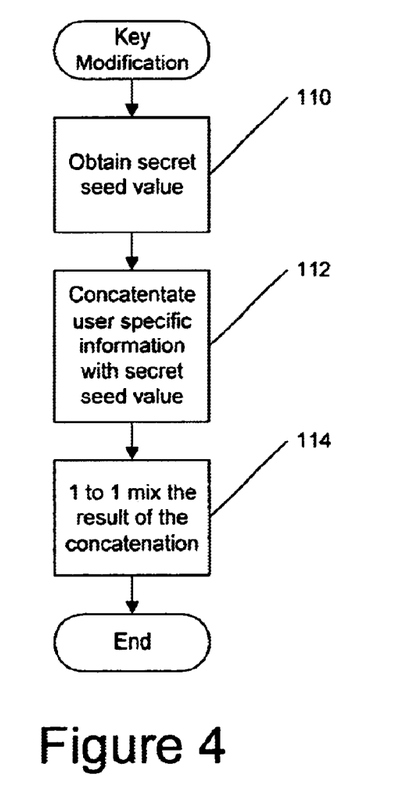
FIG. 4 is a flowchart illustrating operations according to a first alternative embodiment of the present invention.

A first alternative embodiment of the modification of key generation procedures is illustrated in FIG. 4. The operations of FIG. 4 illustrate a particular embodiment for the operations of block 102 of FIG. 3. As seen in FIG. 4, the processor 38 may obtain the secret seed value 70 from memory 36 (block 110). The secret seed value is then combined with user specific information such as the biometric data 72 or a user identification (block 112). This combination may be obtained through a concatenation of the user specific information with the secret seed value. The concatenated user specific information and seed value may then be used as a seed for a key generation procedure such as a pseudo random number generator (PRNG). Such a seed value may be utilized with any number of PRNG procedures or other key generation procedures such as, for example, described in Schneier, B., "Applied Cryptography," 2nd edition, John Wiley & Sons Inc, 1996.

As will be appreciated by those of skill in the art, a PRNG is a procedure for generating pseudo random numbers. A PRNG is typically initialized with one or more secret seed values that are used by the PRNG to generate its pseudo random numbers. However, it is often convenient, and it will be the practice used in describing the present invention, to refer to the PRNG as having only one such secret seed value. If there is more than one seed value, these multiple seed values may be collected within a single structure or composite seed value, thus allowing the multiple seed values to be referred to as a single composite seed value. The PRNG itself can parse the composite seed value to recover the multiple seed values and then use these multiple seeds values internally in any way it sees fit. The initial secret seed value may remain constant, or it may change as a result of PRNG processing.

The pseudo random numbers generated by a PRNG are often used as inputs to a key generation process. The key generation process may be simple, e.g., the generated pseudo random number may be used directly as a key, or the key may be produced by adjusting parity bits in the pseudo random number (e.g., as in a Data Encryption Standard (DES) key), or, the key generation process may be complex, as in the case of RSA key generation. The present invention, therefore, should not be construed as limited to a particular key generation process.

For some PRNGs the specification of a seed value may be inappropriate because the user specific information may be non-secret, and a seed consisting of a secret component concatenated with a non-secret component may be too structured and, therefore, undesirable or unwanted. Thus, as is illustrated in FIG. 4, any structure in the seed may be eliminated by further subjecting the concatenated seed to a mixing step to remove the structure in the concatenated value, and, thereby, to ensure that the entropy in the seed value is distributed, preferably uniformly, over the entire seed value (block 114). For example, the seed value could be defined as seed=f(R,B) where (R,B) is the concatenation of the secret seed value and the user specific information and where f is the 1-to-1 mixing function described in Matyas, M., Peyravian, M., Roginsky, A., and Zunic, N., "Reversible data mixing procedure for efficient publickey encryption," Computers & Security Vol. 17, No. 3, (265–272) 1998, the disclosure of which is incorporated herein as if set forth fully. Those skilled in the art will appreciate that in this alternate embodiment of the present invention, the operations used by the PRNG to generate its pseudo random numbers are not adversely affected by the composition of the seed value.

In the present invention, the key generation process is dependent on user-specific data, such as a userID or biometric data, which provides an additional benefit in reducing the likelihood that two users will randomly generate the same key sequence. Even if the PRNGs of two different users are accidentally initialized with the same secret seed value, utilizing the present invention, the PRNGs will not generate the same sequence of pseudo random numbers. While it is still possible for a pseudo random number in the generated sequence for one user to be equal to a pseudo random number in the generated sequence for another user by pure chance, it should never be the case that the entire sequence of pseudo random numbers for one user would be equal to the entire sequence of pseudo random numbers for another user if the present invention is employed.

Consider an example in which the length of the generated pseudo random numbers is 160 bits, there are $2^{40}$ users, and each user is expected to generate no more than $2^{40}$ pseudo random numbers. In that case, the total expected number of generated pseudo random numbers is $2^{40} \times 2^{40} = 2^{80}$. By the birthday problem, the probability of finding a matching pair of numbers is about ½. And, in fact, one might find a few matching pairs (1, 2, or 3 pairs). But, it is highly unlikely that one would find many such matching pairs. For all practical purposes, each user would generate a unique set of 160-bit pseudo random numbers, regardless of whether the present invention is practiced or not, provided that the initial seed value used by each PRNG has enough entropy, which is a reasonable assumption to make. But, by making the PRNG generation process dependent on user-specific data, one is also guaranteed that no two users can accidentally select the same starting seed value, and hence no two users can accidentally generate the same output sequence of pseudo random numbers.

Furthermore, the present invention also provides a capability for users to prove that a generated pseudo random number belongs to their particular sequence of generated pseudo random numbers, provided that the user saves the initial secret seed value and user-specific data, e.g., by archiving this information in a protected location. In the event of an audit, the user first recovers the secret seed value and the user-specific data, initializes the PRNG, and regenerates their sequence of pseudo random numbers until the pseudo random number, in question, is successfully generated. The user must also prove that the user-specific data provided to the PRNG belongs to them. An attacker could duplicate this process, and generate pseudo random numbers to attack any one particular user, but the generated sequence of pseudo random numbers for one user could not be used to attack another user. Therefore, use of the present invention can make the work of the attacker more difficult.

Figure 5:
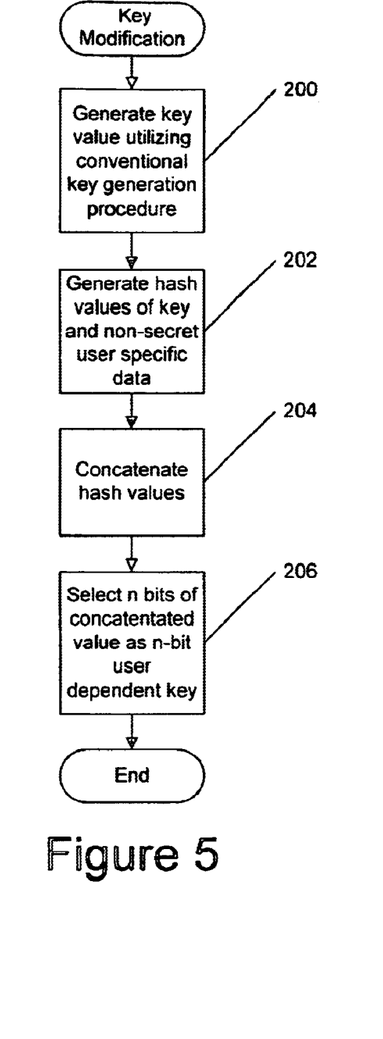
FIG. 5 is a flowchart illustrating operations according to a second alternative embodiment of the present invention.

FIG. 5 illustrates an alternative embodiment of the present invention which, rather than modifying the seed value of a key generation procedure, modifies the output of the key generation procedure. The operations of FIG. 5 correspond to the operations of block 102 and 104 of FIG. 3. As is seen in FIG. 5, a key value is generated utilizing a conventional key generation procedure (block 200). The generated key is then hashed with the non-secret user specific information (block 202) and the hashed values concatenated to provide sufficient bits for the final key value(block 204). The final key value is then determined by selecting the n bits of the final key value from the concatenated hash values to provide a user dependent key value (block 206).

In the alternative embodiment of FIG. 5, a pseudo random number R, which generated by a PRNG and used as the initial key value, and user specific information 9 for a particular user are processed in a complex function to generate an n-bit secret pseudo random number S. S may be used as a key or as an input to a key generation algorithm. In a particular embodiment of the alternative embodiment illustrated in FIG. 5, the hash and concatenation operations are carried out by evaluating:

$$Z=H(R,B)\|H(R+1,B)\|H(R+2,B)\| \ldots \|H(R+a,B)$$

where a=⌈n/h⌉−1, and ⌈x⌉ denotes the smallest integer greater than or equal to x (i.e. a is the largest integer less than n/h) and where n is the number of bits in the final key value and h is the number of bits resulting from the hash operation. For example, if x=3.2, then ⌈x⌉=4. The symbol "∥" denotes the concatenation operation. Then the final key value S may be n specific bits of Z (e.g., the n left-most bits of Z).

When H is a strong collision-resistance one-way hash function, such as the SHA-1 hash operation described in Schneier, B., "Applied Cryptography," 2nd edition, John Wiley & Sons Inc, 1996, it is infeasible to derive either R or B from Z. Also, no information about Z is revealed if at least one of the two input values (i.e., R or B) is not available.

In a particular implementation of the alternative embodiment of FIG. 5, the user may store the value of R and generate S from R and B on demand, when S is needed. For example, S might be an encryption key. In that case, R might be encrypted and stored within a cryptographic subsystem. Whenever the user needs to encrypt/decrypt with S, the user specific information B is obtained, and input to the cryptographic system, R is decrypted, and S is then computed from R and B. In case of an audit, the user can provide R and B, thus allowing an independent third party to verify that S is indeed computed from R and B. An adversary would be unable to perpetrate an attack by directly generating trial values of S, since there would be no way in which values for R and B could be computed in order to pass a later audit. The adversary would be forced to generate trial values for R, and then compute S from R using some particular user's B. Thus, an adversary could perpetrate an attack against one user but could not perpetrate an attack against many users at once, which is often the case unless specific defenses are put in place to prevent such an attack.

Figure 6A:
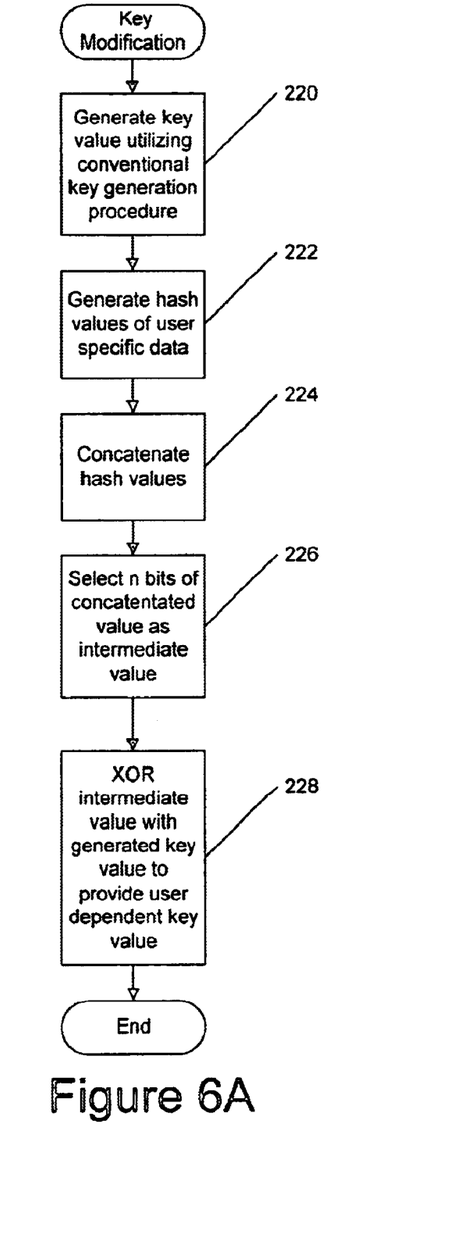
FIG. 6A is a flowchart illustrating operations according to a third alternative embodiment of the present invention.

FIG. 6A illustrates a further embodiment of the present invention. The operations of FIG. 6A correspond to the operations of block 102 and 104 of FIG. 3. In the embodiment of FIG. 6A, an initial key value is generated utilizing a conventional key generation procedure such as through the use of a PRNG (block 220). A hash value of the user specific information is also generated (block 222) and concatenated to provide at least as many bits as the final key value (block 224). Then, n bits of the concatenated hash value are selected to provide an intermediate hash value (block 226) (where n is the number of bits in the final hash value). The selected n bits of the concatenated value are then combined with the initial key value through, for example, XOR' sing the intermediate hash value with the initial key value to provide the final, user dependent, key value (block 228).

In the alternative embodiment of the present invention illustrated in FIG. 6A, a pseudo random number R generated by a PRNG (in advance or dynamically) and user specific information B for a particular user are combined via a simple function (e.g., an Exclusive-OR operation) to generate an n-bit secret pseudo random number S. S may be used as a key or as an input to a key generation procedure.

In a particular embodiment of the alternative embodiment illustrated in FIG. 6A, the hash and concatenation operations are carried out by evaluating:

$$Z=H(B)\|H(B+1)\|H(B+2)\| \ldots \|H(B+a)$$

where a=⌈n/h⌉−1, and ⌈x⌉ denotes the smallest integer greater than or equal to x (i.e. a is the largest integer less than n/h) and where n is the number of bits in the final key value and h is the number of bits resulting from the hash operation. The symbol "∥" denotes the concatenation operation. Then the intermediate hash value S may be n specific bits of Z (e.g., the n left-most bits of Z). The final, user dependent key value may then be generated by determining S=R⊕S.

Figure 6B:
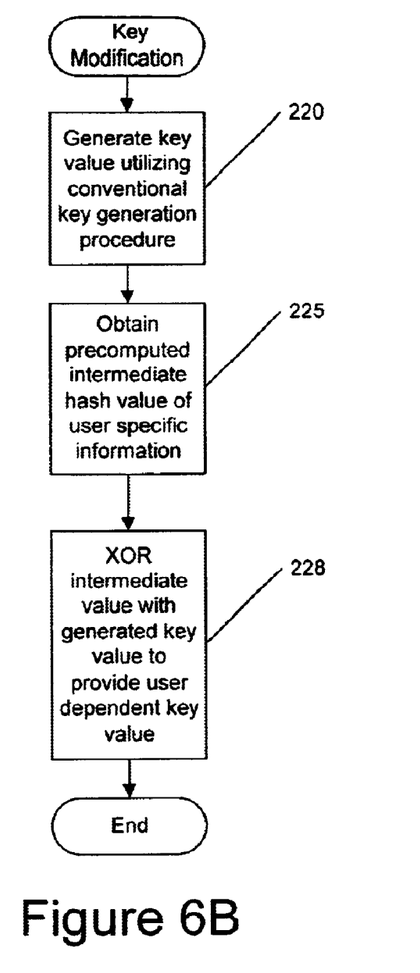
FIG. 6B is a flowchart illustrating operations of a preferred embodiment of the third alternative embodiment illustrated in FIG. 6A.

FIG. 6B illustrates a particular implementation of the embodiment of the present invention illustrated in FIG. 6A. An example illustrating the use of the described method would be a host system supporting multiple users, where the host makes use of a single secret master key R and each user "i" has a dynamically generated variant key $S_i$ computer from $X_i$, the user specific information for user "i" and R.

As seen in FIG. 6B, the key value is generated utilizing a conventional key generation process (block 220). This initial key value is then combined with a pre-computed intermediate hash value based on the user specific information (blocks 225 and 228). Thus, when a user requires a key to be generated, all that need be generated is the initial key which may be done utilizing a conventional process and then the pre-computed intermediate hash value XOR'ed with the initial key to provide the final user dependent key value. Thus, the embodiment of the present invention illustrated in FIG. 6B may be readily implemented as an add-on feature to existing encryption methodologies or applications. Furthermore, only minimal processing capabilities need be utilized because of the use of a pre-computed hash value and the simple operation utilized to combine the hash value and the key value. Accordingly, the embodiment of FIG. 6B may be suitable for portable computing or "pervasive computing" devices such as smartphones, personal data assistants, or the like, with limited processing capabilities and limited battery life.

As a result of the use of a hash function which would have a hash function collision probability, there is no guarantee that a key or random number derived for a user will be unique. For example, two users with different biometric data may end up having the same S because of the results of the hash function. The probability of two users ending up with the same S will be quite small if n and h are chosen to be large. However, the probability does exist.

Figure 7:
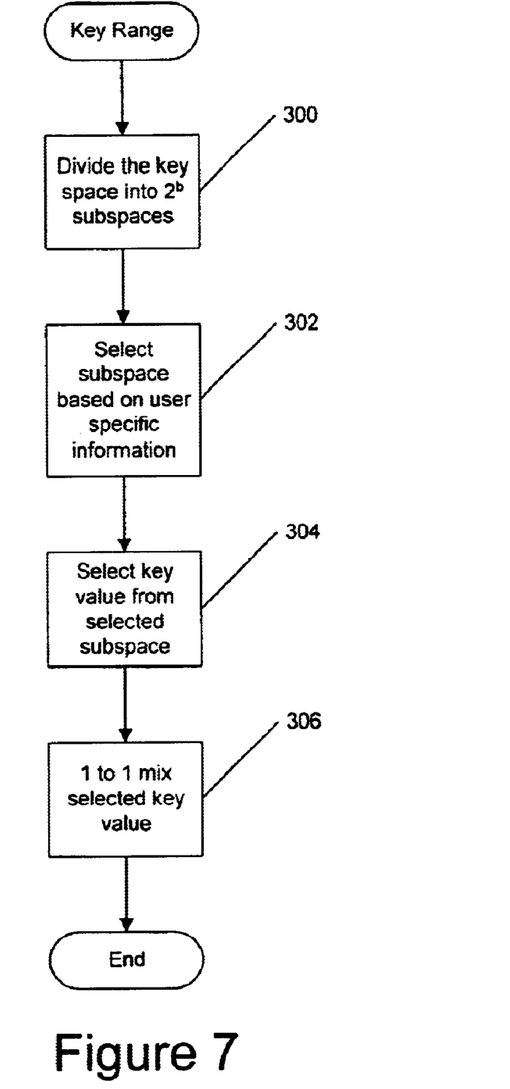
FIG. 7 is a flowchart illustrating operations according to a fourth alternative embodiment of the present invention.

FIG. 7 illustrates an embodiment of the present invention which guarantees that two different users will generate different key values. The operations of FIG. 7 correspond to the operations of block 102 and 104 of FIG. 3. As seen in FIG. 7, the space of all potential key values (i.e. $2^n$ for an n-bit key value) is divided into $2^b$ subspaces where b is the number of bits of user specific information and where n>b (block 300). Note that each of the $2^b$ subspaces contain key values having n bits. One of the subspaces is then selected based on the user specific information of a particular user (block 302). The user dependent key value is then selected from the subspace selected by the user specific information (block 304). Optionally, the selected key may be further mixed (block 306) utilizing a mixing function, such as the 1 to 1 mixing function described above.

As an example, a way to divide an n-bit space into $2^b$ sub-spaces is to take the first b bits from the user specific information and allow the remaining n-b bits to take any value (e.g. concatenating a random value of n-b bits with the b bits of the user specific information). The b-bit user specific data may include a t-bit field which indicates the type of biometric data (e.g., fingerprint, hand geometry, iris pattern, facial features, etc.).

As described above, if the operations illustrated in FIG. 7 are terminated at block 304, the generated random number or key is, in general, highly structured. In this case, the generated n-bit cryptographic variable (random number or key) consists of a user-specific portion of b bits (e.g., biometric data) and a random secret portion of n-b bits. If the user-specific portion is a userID, then the user-specific portion would be a non-secret constant value for each user. If the users-pecific portion is biometric data, then the user-specific portion might still be non-secret and contain structure or redundancy. In either case, it could be undesirable for a key or random number to contain so much predictability in some particular portion of it which might give an attacker some advantage. Thus, it may be advantageous to employ a mixing function to mix the user-dependent key or random number so that the secret entropy in it will be uniformly spread over the entire key or random number.

As illustrated in optional block 306 of FIG. 7, the n-bit key or random value produced is subjected to a further mixing operation. The n-bit key or random value, produced using the above scheme, is mixed using a 1-to-1 mixing function to produce the final value. One such suitable 1-to-1 mixing function is the reversible data mixing function described in Matyas, M., Peyravian, M., Roginsky, A., and Zunic, N., "Reversible data mixing procedure for efficient public-key encryption," Computers & Security Vol. 17, No. 3, (265–272) 1998, which can be applied to any arbitrary n-bit input.

The specification of the b bits of user-specific information can be further explained, and amplified on. In certain cases, the values of n and b will be specified or fixed. In that case, the length of the user-specific information L may be less than b (L<b), equal to b (L=b), or greater than b (L>b). If L=b, then the entire user-specific information is used as the desired b bits. If L<b, then the desired b bits can be obtained as a function of the user-specific information, e.g., by tiling the user-specific information and selecting the first b bits from the tiled user-specific information. If L>b, then b bits can be obtained as a function of the user-specific information, e.g., by hashing the user-specific information using a method such as the method described in FIG. 6A and selecting b specific bits of Z where Z=H(B)||H(B+1)||H(B+2)|| . . . ||(B+a).

As an example of the use of the embodiment of the present invention described in FIG. 7, in a public key system based on the RSA algorithm, the public modulus is the product of two large prime numbers. It has been suggested that two users with different moduli might have a common prime factor in their moduli, either by accident or because of a poor design (design flaw) in the system. If $N_1=p_1 \times q_1$ and $N_2=p_2 \times q_2$, where (say) $P_1=P_2$, then it is easy to find $p_1$ or $P_2$ given $N_1$ and $N_2$ and, i.e., an efficient algorithm exists to find the common factor $p_1$ or $P_2$ given $N_1$ and $N_2$. If such a common prime factor were to exist, and this fact were discovered, then it would be also be an easy matter to factor each modulus into its prime factors. This, of course, would allow the private keys to be computed from the corresponding public keys, and hence, for the security of the keys to be compromised. The present invention can guarantee that no two users would inadvertently generate the same prime numbers in their respective keys.

While the present invention does not guarantee that the same user will not accidentally generate the same primes, if the user saves all prior moduli, it could be readily determined if the newly generated primes are factors of any previously generated moduli. Such testing would be up to the user, and totally under the user's control, both to save prior moduli and test these moduli. The really difficult and insurmountable problem would be to test one user's primes against the moduli for all other users. The present invention obviates the need for such testing.

Another benefit of the utilization of the present invention, is that by making the key or random number generation process dependent on user-specific data, such as a userID or biometric data, one has the ability to later prove that a generated key or random number belongs to a particular user. In this regard, the present invention can provide a means to "brand" a key or random number so that its rightful user can be determined. This branding feature may ensure that a user can prove that a key or random number is one belonging to, or generated in, his designated space of keys or random numbers and that a user cannot deny that a key or random number is one belonging to, or generated in, his designated space of keys or random numbers.

Figure 8:
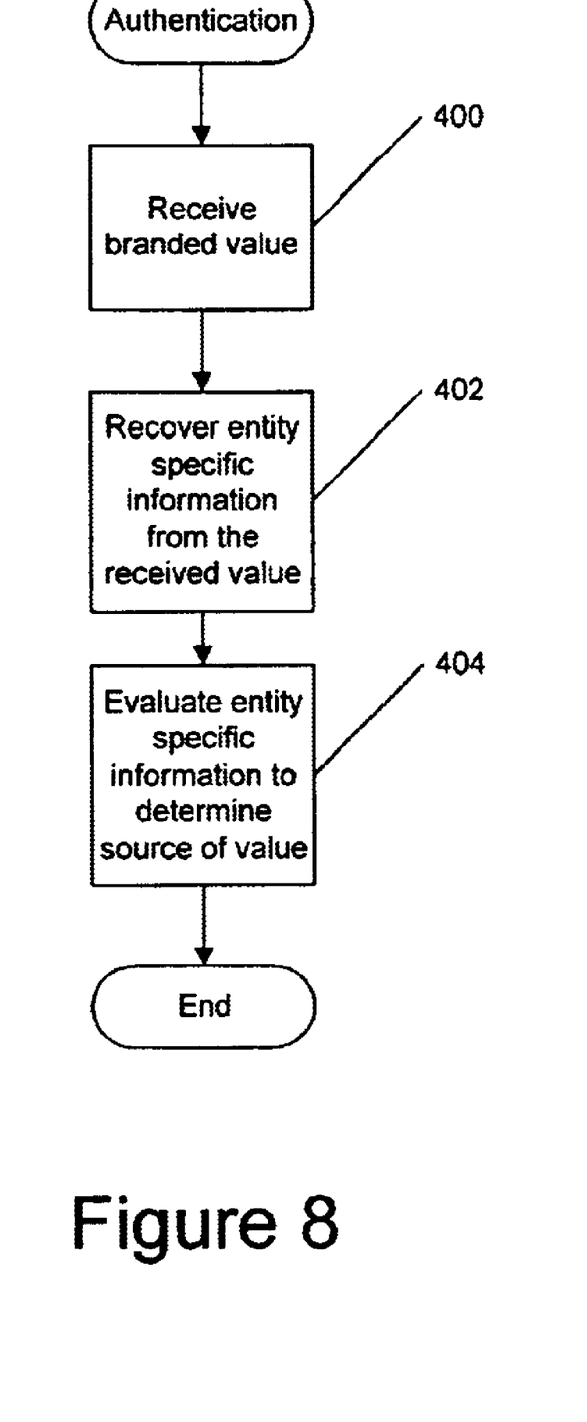
FIG. 8 is a flowchart illustrating authentication/auditing of a branded value according to one embodiment of the present invention.

FIG. 8 illustrates operations according to a further embodiment of the present invention which utilizes the branded key or value to authenticate the source of the value. As seen in FIG. 8, the branded value is received (block 400) and entity specific information (such as the user specific information described above) is recovered from the received branded value. The branded value is preferably a value which has been generated in a manner described above according to the various embodiments of the present invention utilizing the user specific information to provide the branded value. After recovering the entity specific information, this information is then utilized to determine the source of the branded value (block 404). As has briefly been described above, this recovery and evaluation may take the form of recreating the branded value utilizing the generation procedure utilized by the source and then comparing this recreated value with the received value. Preferably, however, the recovery and evaluation are performed by determining if the received value is a value from the subspace of the source. If such is the case, then the source of the branded value is authenticated.

In a public key cryptosystem, consider the case where an adversary steals another user's private key, and then takes the public key and requests and receives a certificate for that public key from a certification authority (CA). In this case, the certificate binds the public key to the adversary's userID. The adversary then signs with the stolen private key. Later, the adversary repudiates their signatures by claiming that the other party stole their private key. However, the branding of the present invention can defend against the described attack. If a dispute arises, the branded key will indicate which user is the authorized user.

In case of a dispute, the user-specific information in the branded key or cryptographic variable is used to determine the identity of the user to whom the key belongs. If the user-specific data is a userID, then the identity of the user is automatically known. If the user-specific data is biometric data, then the biometric data is used to establish the identity of the user, using a biometric identification process. The process of biometric identification consists of comparing the given biometric data against a set of biometric templates, e.g., a set of biometric templates stored in a central data base. We assume that for each such biometric template there is an associated userID identifying the user to which the template pertains. If a "match" is found, then the identity of the user has been determined.

However, if it were the case that the presumed identity of the user is given, then a biometric verification procedure could be used instead. If the biometric data stored in the key or cryptographic variable were a biometric template, then the user could be asked to provide a biometric sample, thus enabling the user to authenticated against the given biometric template. If the biometric data stored in the key or cryptographic variable were instead a biometric sample, then the biometric sample would have to be authenticated against a biometric template (for that user), e.g., a biometric template stored in a central data base or a biometric template contained in a trustworthy biometric certificate that itself could be validated.

If the user specific information in the branded key or cryptographic variable has been hashed (as, for example, utilizing the operations of FIGS. 5 through 6B), then the procedure for determining the identity of the user to whom the key or cryptographic variable belongs operates differently. In this case, the presumed or claimed identity is used to determine the associated or corresponding user-specific information, e.g., by locating this stored information within the system. This user specific information is hashed (using the same procedure originally used to generate the hashed value in the branded key or cryptographic variable) and then compared for equality with the hashed user-specific information in the branded key or cryptographic variable. If these two values are equal, then the identity of the user to whom the key or cryptographic variable belongs has been identified. A similar procedure may be utilized for the generation operations illustrated in FIG. 4 by recreating the generated key utilizing the user specific information and the secret seed value of the source of the branded value.

The present invention has also been described with reference to the use of user specific information. User specific information could be a userID or, biometric information or a combination of the two. In this regard, the present invention provides a means to "brand" a key or random number so that its rightful user can be determined. Those skilled in the art will recognize that such branding is not limited to only users, but could be used to brand a key or value with information specific to and associated with an entity where the entity is other than a human user. For example, the user specific information could be used to brand information with a company identifier (companyID), thus enabling one to show that the branded value belongs to a specific company. Whereas a biometric is associated with a specific user, an identifier could be associated with a user, group, organization, company, etc., and therefore the present invention is not limited to a method of branding based only on user specific information. Thus, as used herein the term user specific information may also refer to entity-specific information. A human user is just an example of one type of entity.

In several instances, the present invention has been described with respect to a pseudo-random-number generated by a pseudo random number generator. Those skilled in the art will appreciate that the invention can be practiced instead using random numbers produced by a true random number generator, or using other values not necessarily random or pseudo random numbers, such as keys or cryptographic values defined or used for some other purpose within the system or using values provided to the procedure by some other source outside the system. Thus, the present invention may be utilized to operate on an initial cryptographic value irrespective of the manner in which the initial cryptographic value is obtained.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of generating a cryptographic value, the method comprising the steps of:

obtaining non-secret user specific information about a user;

obtaining an initial cryptographic value; and modifying the initial cryptographic value with the non-secret user specific information so as to provide a user dependent cryptographic value by hashing the initial cryptographic value and the non-secret user specific information utilizing a one-way hash operation so as to generate the user dependent cryptographic value;

wherein the user dependent key value (S) comprises n bits, wherein the results of the hash operation provides h bits and wherein the step of hashing comprises the steps of:

determining an intermediate hash value (Z) utilizing the concatenation of hash values defined by, $$Z=H(R,B)\|H(R+1,B)\|H(R+2,B)\| \ldots H(R+a,B)$$

where H is the one way hash operation, B is the non-secret user specific information and a is the largest integer smaller than n/h; and selecting n bits from Z so as to provide the user dependent cryptographic value.

2. A method according to claim 1, wherein the selected n bits comprise the n most significant bits of Z.

3. A method according to claim 1, wherein the non-secret user specific information is biometric information.

4. A method according to claim 1, wherein the non-secret user specific information is a globally unique user identification.

5. A method according to claim 1, wherein the step of obtaining an initial cryptographic value comprises the step of generating a pseudo-random value utilizing a pseudo random number generator.

6. A method of generating a cryptographic value, the method comprising the steps of:

obtaining an initial cryptographic value; and obtaining a final intermediate value as a function of user specific information about a user; and combining the final intermediate value with the initial cryptographic value so as to provide a user dependent cryptographic value;

wherein the user dependent cryptographic value (S) comprises n bits and wherein the step of obtaining a final intermediate value comprises the steps of:

determining a first intermediate hash value (Z) utilizing the concatenation of hash values defined by, $$Z=H(B)\|H(B+1)\|H(B+2)\| \ldots H(B+a)$$

where H is the one way hash operation, B is the user specific information and a is the largest integer smaller than n/h where h is a number of bits resulting from the hash operation H; and selecting n bits from Z so as to provide the final intermediate value.

7. A method according to claim 6, wherein the selected n bits comprise the n most significant bits of Z.

8. A method according to claim 6, wherein the step of combining comprises the step of EXCLUSIVE ORing the initial cryptographic value and the final intermediate value.

9. A method according to claim 6, further comprising the step of storing the final intermediate value so as to provide a pre-computed intermediate value and wherein the step of obtaining an intermediate value comprises the step or obtaining the pre-computed intermediate value.

10. A method according to claim 6, wherein the user specific information is biometric information.

11. A method according to claim 6, wherein the user specific information is a globally unique user identification.

12. A method according to claim 6, wherein the step of obtaining an initial cryptographic value comprises the step of generating a pseudo-random value utilizing a pseudo random number generator.

13. A method of generating a cryptographic value, the method comprising the steps of:
  obtaining user specific information about a user;
  selecting a user dependent cryptographic value from a user specific range of cryptographic values based on the user specific information, wherein the user specific range of cryptographic values comprises a subspace of a range of potential cryptographic values from which a value generation procedure selects a cryptographic value;
  wherein the user specific information comprises b bits and the cryptographic values comprise n bits, the method further comprising the steps of:
    dividing the range of potential cryptographic values into $2^b$ subspaces; and
    selecting one of the subspaces as the user specific range of cryptographic values based on the user specific information so as to provide the user specific range of cryptographic values.

14. A method according to claim 13, further comprising the step of mixing bits of the selected user dependent cryptographic value so as to increase the uniformity of a distribution of entropy in the user dependent cryptographic value.

15. A method according to claim 13, wherein the user specific information is a globally unique user identification.

16. A method of authenticating a cryptographic value, the method comprising the steps of:
  obtaining entity specific information associated with a source entity;
  modifying a specified cryptographic value with the entity specific information to produce a branded value;
  receiving the branded value;
  recovering the entity specific information from the received branded value; and
  determining the source entity of the received branded value based on the recovered entity specific information;
  wherein the step of modifying a specified cryptographic value comprises the step of:
    modifying a seed value of a key generation procedure with the entity specific information so that the key generation procedure generates an entity dependent cryptographic key so as to provide the branded value; and
  wherein the steps of recovering the entity specific information from the received branded value and determining the source entity of the received branded value based on the recovered entity specific information comprises the steps of:
    generating a second branded value utilizing an expected seed value and the entity specific information and the key generation procedure; and
    comparing the generated second branded value with the received branded value.

17. A method according to claim 16, wherein the entity specific information comprises a globally unique user identification associated with a user.

18. A method according to claim 16, wherein the entity specific information comprises a company identification.

19. A method of authenticating a cryptographic value, the method comprising the steps of:
  obtaining entity specific information associated with a source entity;
  modifying a specified cryptographic value with the entity specific information to produce a branded value;
  receiving the branded value;
  recovering the entity specific information from the received branded value; and
  determining the source entity of the received branded value based on the recovered entity specific information;
  wherein the step of modifying a specified cryptographic value comprises the step of:
    hashing the specified cryptographic value and the entity specific information utilizing a one-way hash operation so as to generate the branded value;
  wherein the steps of recovering the entity specific information from the received branded value and determining the source entity of the received branded value based on the recovered entity specific information comprise the steps of:
    generating a second branded value by hashing an expected specified cryptographic value and the entity specific information utilizing the one-way hash function; and
    comparing the generated second branded value with the received branded value.

20. A method of authenticating a cryptographic value, the method comprising the steps of:
  obtaining entity specific information associated with a source entity;
  modifying a specified cryptographic value with the entity specific information to produce a branded value;
  receiving the branded value;
  recovering the entity specific information from the received branded value; and
  determining the source entity of the received branded value based on the recovered entity specific information;
  wherein the step of modifying a specified cryptographic value comprises the steps of:
    obtaining a final intermediate value as a function of the entity specific information; and
    combining the final intermediate value with the specified cryptographic value so as to provide the branded value.

21. A method according to claim 20,
  wherein the steps of recovering the entity specific information from the received branded value and determining the source entity of the received branded value based on the recovered entity specific information comprises the steps of:
    generating a second branded value by combining an expected specified cryptographic value and the final intermediate value; and
    comparing the generated second branded value with the received branded value.

22. A method according to claim 16, wherein the step of modifying a specified cryptographic value comprises the step of:

selecting a value from an entity specific range of cryptographic values based on the entity specific information, wherein the entity specific range of cryptographic values comprises a subspace of a range of potential cryptographic values from which a value generation procedure selects a cryptographic value so as to provide the branded value.

23. A method according to claim 22, wherein the steps of recovering the entity specific information from the received branded value and determining the source entity of the received branded value based on the recovered entity specific information comprises the step of:

determining if the received branded values is within the entity specific range of cryptographic values associated with the source entity of the received branded value.

24. A system for generating a cryptographic value, comprising:

means for obtaining non-secret user specific information about a user;

means for obtaining an initial cryptographic value; and means for modifying the initial cryptographic value with the non-secret user specific information so as to provide a user dependent cryptographic value by hashing the initial cryptographic value and the non-secret user specific information utilizing a one-way hash operation so as to generate the user dependent cryptographic value;

wherein the user dependent key value (S) comprises n bits, wherein the results of the hash operation provides h bits and wherein the means for modifying comprises:

means for determining an intermediate hash value (Z) utilizing the concatenation of hash values defined by, $$Z = H(R,B) \| H(R+1,B) \| H(R+2,B) \| \ldots H(R+a,B)$$

where H is the one way hash operation, B is the non-secret user specific information and a is the largest integer smaller than n/h; and means for selecting n bits from Z so as to provide the user dependent cryptographic value.

25. A system for generating a cryptographic value, comprising:

means for obtaining an initial cryptographic value; and means for obtaining a final intermediate value as a function of the user specific information about a user; and means for combining the final intermediate value with the initial cryptographic value so as to provide the user dependent cryptographic value;

wherein the user dependent cryptographic value (S) comprises n bits and wherein the means for obtaining a final intermediate value comprises:

means for determining a first intermediate hash value (Z) utilizing the concatenation of hash values defined by, $$Z = H(B) \| H(B+1) \| H(B+2) \| \ldots H(B+a)$$

where H is the one way hash operation, B is the user specific information and a is the largest integer smaller than n/h where h is a number of bits resulting from the hash operation H; and means for selecting n bits from Z so as to provide the final intermediate value.

26. A system for generating a cryptographic value, comprising:

means for obtaining user specific information about a user;

means for selecting a user dependent cryptographic value from a user specific range of cryptographic values based on the user specific information, wherein the user specific range of cryptographic values comprises a subspace of a range of potential cryptographic values from which a value generation procedure selects a cryptographic value;

wherein the user specific information comprises b bits and the cryptographic values comprise n bits, the system further comprising:

means for dividing the range of potential cryptographic values into $2^b$ subspaces; and means for selecting one of the subspaces as the user specific range of cryptographic values based on the user specific information so as to provide the user specific range of cryptographic values.

27. A system for authenticating a cryptographic value, comprising:

means for obtaining entity specific information associated with a source entity;

means for modifying a specified cryptographic value with the non-secret entity specific information to produce a branded value;

means for receiving the branded value;

means for recovering the entity specific information from the received branded value; and means for determining the source entity of the received branded value based on the recovered entity specific information;

wherein the means for modifying a specified cryptographic value comprises:

means for modifying a seed value of a key generation procedure with the entity specific information so that the key generation procedure generates an entity dependent cryptographic key so as to provide the branded value; and wherein the means for recovering the entity specific information from the received branded value and the means for determining the source entity of the received branded value based on the recovered entity specific information comprises:

means for generating a second branded value utilizing an expected seed value and the entity specific information and the key generation procedure; and means for comparing the generated second branded value with the received branded value.

28. A computer program product for generating a cryptographic value, comprising:

a computer-readable storage medium having computer-readable program code means embodied in said medium, said computer-readable program code means comprising:

computer-readable program code means for obtaining non-secret user specific information about a user;

computer-readable program code means for obtaining an initial cryptographic value; and computer-readable program code means for modifying the initial cryptographic value with the non-secret user specific information so as to provide a user dependent cryptographic value by hashing the initial cryptographic value and the non-secret user specific information utilizing a one-way hash operation so as to generate the user dependent cryptographic value;

wherein the user dependent key value (S) comprises n bits, wherein the results of the hash operation provides h bits and wherein the computer readable code means for modifying comprises:

computer readable code means for determining an intermediate hash value (Z) utilizing the concatenation of hash values defined by, $$Z=H(R,B)\|H(R+1,B)\|H(R+2,B)\| \ldots H(R+a,B)$$

where H is the one way hash operation, B is the non-secret user specific information and a is the largest integer smaller than n/h; and computer readable code means for selecting n bits from Z so as to provide the user dependent cryptographic value.

29. A computer program product for generating a cryptographic value, comprising:

a computer-readable storage medium having computer-readable program code means embodied in said medium, said computer-readable program code means comprising:

computer-readable program code means for obtaining an initial cryptographic value;

computer-readable program code means for obtaining a final intermediate value as a function of the user specific information about a user; and computer-readable program code means for combining the final intermediate value with the initial cryptographic value so as to provide the user dependent cryptographic value;

wherein the user dependent cryptographic value (S) comprises n bits and wherein the computer-readable program code means for obtaining a final intermediate value comprises:

computer-readable program code means for determining a first intermediate hash value (Z) utilizing the concatenation of hash values defined by, $$Z=H(B)\|H(B+1)\| \ldots H(B+2)\| \ldots H(B+a)$$

where H is the one way hash operation, B is the user specific information and a is the largest integer smaller than n/h where h is a number of bits resulting from the hash operation H; and computer-readable program code means for selecting n bits from Z so as to provide the final intermediate value.

30. A computer program product for generating a cryptographic key, comprising:

a computer-readable storage medium having computer-readable program code means embodied in said medium, said computer-readable program code means comprising:

computer-readable program code means for obtaining user specific information about a user;

computer-readable program code means for selecting a user dependent cryptographic value from a user specific range of cryptographic values based on the user specific information, wherein the user specific range of cryptographic values comprises a subspace of a range of potential cryptographic values from which a value generation procedure selects a cryptographic value;

wherein the user specific information comprises b bits and the cryptographic values comprise n bits, the computer program product further comprising:

computer-readable program means for dividing the range of potential cryptographic values into $2^b$ subspaces; and computer-readable program means for selecting one of the subspaces as the user specific range of cryptographic values based on the user specific information so as to provide the user specific range of cryptographic values.

31. A computer program product for authenticating a cryptographic value, comprising:

a computer-readable storage medium having computer-readable program code means embodied in said medium, said computer-readable program code means comprising:

computer-readable program code means for obtaining entity specific information associated with a source entity;

computer-readable program code means for modifying a specified cryptographic value with the non-secret entity specific information to produce a branded value;

computer-readable program code means for receiving the branded value;

computer-readable program code means for recovering the entity specific information from the received branded value; and computer-readable program code means for determining the source entity of the received branded value based on the recovered entity specific information, wherein the computer-readable program code means for modifying a specified cryptographic value comprises:

computer-readable program code means for modifying a seed value of a key generation procedure with the entity specific information so that the key generation procedure generates an entity dependent cryptographic key so as to provide the branded value; and wherein the computer-readable program code means for recovering the entity specific information from the received branded value and the computer-readable program code means for determining the source entity of the received branded value based on the recovered entity specific information comprises:

computer-readable program code means for generating a second branded value utilizing an expected seed value and the entity specific information and the key generation procedure; and computer-readable program code means for comparing the generated second branded value with the received branded value.

* * * * *